United States Patent [19]

Guzman-Edery et al.

[11] Patent Number: 4,943,926
[45] Date of Patent: Jul. 24, 1990

[54] METHOD FOR THE ANALYSIS AND SYNTHESIS OF BINARY SIGNALS

[75] Inventors: Jorge Guzman-Edery, Heddesheim; Wolfgang Steiger, Lampertheim; Michael Böer, Mannheim, all of Fed. Rep. of Germany

[73] Assignee: BBC Aktiengesellschaft Brown, Boveri & Cie, Baden, Switzerland

[21] Appl. No.: 916,820

[22] Filed: Oct. 9, 1986

[30] Foreign Application Priority Data

Oct. 9, 1985 [DE] Fed. Rep. of Germany ....... 3536031

[51] Int. Cl.⁵ .................. H04L 1/20; H04L 25/04; G06F 15/20
[52] U.S. Cl. ..................... 364/486; 328/22; 328/164; 375/4
[58] Field of Search ............ 364/486; 375/3, 3.1, 375/4, 16; 328/22, 164

[56] References Cited

U.S. PATENT DOCUMENTS 4,227,251 10/1980 Kazama et al. ................ 375/4 X
4,327,356 4/1982 Gilliland ........................ 375/4 X
4,546,394 10/1985 Yamamoto .................... 328/164 X

FOREIGN PATENT DOCUMENTS 3131845 2/1983 Fed. Rep. of Germany .......... 375/4

Primary Examiner—Felix D. Gruber
Attorney, Agent, or Firm—Herbert L. Lerner; Laurence A. Greenberg

[57] ABSTRACT

Method for analyzing and synthesizing pulses using a first pulse state memory for storing the pulse state connected to a pulse edge detector for detecting a pulse change of state, the latter connected to the reset pin of a pulse counter driven by a clock; a first-in-first-out memory connected to the counter for receiving the counter content for each pulse, and a microprocessor connected to the first-in-first-out memory output, having a signal pulse list for storing for each pulse its state and pulse length measured in clock counts. Two or more associate memories are provided for storing clock count of any 0-state pulse and any 1-state pulse, and a pulse display connected to each associate memory to display any 0-state pulse and any 1-state pulse as a percentage of the total pulse period To.

6 Claims, 5 Drawing Sheets

METHOD FOR THE ANALYSIS AND SYNTHESIS OF BINARY SIGNALS

BACKGROUND AND PRIOR ART

The invention relates to a method for the analysis and synthesis of binary signals. Binary signals can involve individual elements (pulses, pauses) or a sequence of several elements, i.e. transmission blocks or messages.

For measurements on data lines as well as for checking received binary signals in a receiving device, methods and apparatus are used which allow the determination of signal distortion. Commercially available PCM digital signal analyzers or telegraphy distortion-measuring devices as discussed, for instance, in "Einheiten, Grundbegriffe, Messverfahren der Nachrichtenübertragungstechnik" (Units, Fundamentals, Measuring Methods in Telecommunications), 4th ed., Editor and Publisher: Siemens AG, especially at pages 150 to 157. Such devices are costly and are suitable only for pulse-modulated signals.

German Published, Non-Prosecuted Application DE-OS No. 31 31 845 discloses a method for generating and detecting binary signals with any signal coding. For receiving binary signals, the state (0 or 1 state) of each pulses from a receiving line is sampled at a selectable sampling rate and, with the aid of a processor, a signal list is prepared which represents an image of the waveform of the line states. The content of the state list is available for an evaluation of the signal content. In the cited publication it is also mentioned that excessive signal distortion can be recognized by means of this signal list. However, no teachings are disclosed for this purpose and, in particular, it is not evident how a quantitative measurement of the signal distortion and an indication can be carried out.

Starting from the method known from German Published, Non-Prosecuted Application DE-OS No. 31 31 845, it is accordingly an object of the invention to provide a method for the analysis and synthesis of binary signals, which overcomes the hereinafore-mentioned disadvantages of the heretofore-known method of this general type, and especially which makes it possible to provide a quantitative measurement of the signal distortion. In addition, the method should also permit a synthesis of binary signals.

SUMMARY OF THE INVENTION

With the foregoing and other objects in view there is provided, in accordance with the invention, a method for the analysis and synthesis of binary signals, which includes measuring the duration of a signal pulse by counting units of time, while receiving the pulse; determining the pulse state by means of state memories; determining where the counter is started at a first pulse state change by multiple sampling of a received signal element; continuing counting with every sampling pulse; transferring the counter reading reached into a first-in-first-out i.e. "fifo" memory with a further pulse state change; resetting and restarting the counter, transferring the polarity determined during the counting operation into the fifo memory and transferring the signal bytes formed in this manner for interim storage into the fifo memory; transferring the signal bytes from the fifo memory to a microprocessor; and depositing the signal bytes in a signal list in the microprocessor memory; retransmitting the signal by taking one signal byte at the time from the signal list; loading the signal byte into a register; controlling a programmable counter on the basis of the counter reading which equals the length of the pulse information in the signal byte; determining the duration of the signal pulse to be generated on the basis of the counting time; determining the state of the pulse by means of a state, memory which is controlled directly by the state bit of the signal byte stored in the register.

Advantages of the method are that any desired section of a data stream on a receiving line can be analyzed. The signal modulation can be of any type and is, therefore, not limited to PCM pulse code modulation. Furthermore, the synchronizing signals, the message format, the coding and transmission security may be of any type.

The analysis of messages relates particularly to the quantitative measurement of the signal distortion of individual message steps and is possible in accordance with differently defined signal distortions and measuring methods such as isochronous, start/stop, time raster and time measuring methods. Synchronization required for the measurement of the start signals of any pulse sequence is possible, as well as, processing of a non-integral character length referred to a standard pulse length or sampling time $T_o$ such as 1.5 $T_o$, 2.2 $T_o$, 3.7 $T_o$. Very short pulses, so-called spikes, can also be detected and processed or can be selected by means of an adjustable interference pulse suppression scheme. The pulse edge position of the pulses can be determined with high resolution, such as 1%.

The message analysis can also relate, for instance, to decoding the information content (1, 0, errors) of signals, to checking the format or format decoding or to test signal decoding.

All of these analyses are made possible by the creation of a tabular image of the state of the line through listing of signal bytes according to the invention and the utilization of the signal bytes contained in this list for the addressing of tables which contain an interpretation of the information content or establish correlation with a measurement value. The tables are addressed after the content of successive signal bytes is processed by means of a processing algorithm.

The method according to the invention can further be used advantageously for constructing synthesizers, i.e. for the conversion of stored signal patterns into synthesized signals. In accordance with another mode of the invention, the method includes measuring the pulse duration while receiving the pulse, by means of a programmable counter; determining the pulse state by means of state memories: determining where the counter is started at a first pulse state change by multiple sampling of a received signal element; continuing counting with every sampling pulse, transferring the counter-reading reached into a fifo memory with a further pulse state change; resetting and restarting the counter anew: transferring the state determined during the counting operation into the fifo memory and transferring the signal bytes formed in this manner for interim storage into the fifo memory; transferring the signal bytes to a signal list in microprocessor memory; taking a signal byte from the signal list for transmission of signals; loading the signal byte into a register; controlling a programmable counter on the basis of the length of the pulse information in the signal byte: determining the duration of the signal pulse to be generated on the basis of the counting time; determining the state of the pulse by means of a state memory controlled directly by the state bit of the signal byte stored in the register; next, distortion tables are formed in an associate memory, the distortion tables are addressed by means of the readings stored in the signal list, and the distortion values are stored in the distortion tables, and finally the distortion values as determined by their address can be read directly or the values can be interconnected in some logical manner.

In accordance with an additional mode of the invention, the method comprises depositing the signal distortion values in the tables as percentage values.

In accordance with an added mode of the invention, the method comprises displaying the read-out distortion values as bar indicators.

In accordance with a further mode of the invention, the method comprises forming further tables which are addressed by signal bytes from the signal list, forming auxiliary values; and performing a determination of the start signals and other signals and an analysis of the information content of the binary signals by means of the auxiliary values.

In accordance with again another mode of the invention, the method comprises detecting spikes by evaluation of the read-out signal distortion values.

In accordance with a concomitant mode of the invention, the method comprises calling information from transfer lists for the synthesis of signals: and transferring the information as signal bytes into the signal list.

Other features which are considered as characteristic for the invention are set forth in the appended claims.

Although the invention is illustrated and described herein as embodied in a method for the analysis and synthesis of binary signals, it is nevertheless not intended to be limited to the details shown, since various modifications and structural changes may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
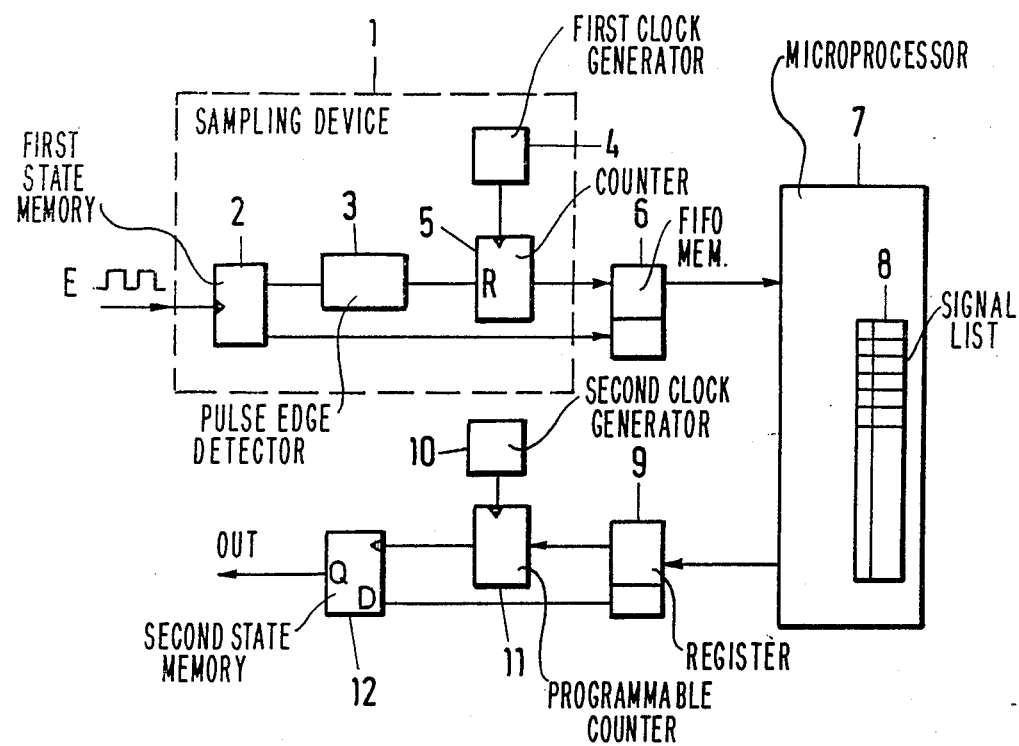
FIG. 1 is a block circuit diagram of a device for creating an image of the state of the lines (signal list)

Referring now to the figures of the drawings in detail and first, particularly, to FIG. 1 thereof, there is seen a device, which is already known in principle from the state of the art for creating an image of the state of the lines. A received signal E is fed to a sampling device 1. The state (0 or 1 level) of a digital signal and its duration are determined by the sampling device 1. The signal is sampled not once, for instance, in the middle of the pulse, but very frequently. In view of the utilization of the signal presentation provided by the invention for determining the signal distortion, sampling of about 100-times is advisable for achieving a resolution of 1%. In addition, a sampling time $T_o$ is defined according to the invention, which has the duration of a standard signal pulse used for the transmission. In the present example, 96-times sampling within the sampling time $T_o$ is chosen because this sampling rate is advantageous in view of the Baud rates used. The sampling is accomplished by means of a counter 5 which is contained in the sampling device 1 and is driven by a clock generator 4.

The sampling device contains in addition a device 3 for pulse flank or edge detection. The counter 5 is stopped at each occurrence of a signal flank or edge: its reading is transferred to a subsequent fifo (first-in, first-out) memory 6 and the counter 5 is reset to zero. The counter is also reset to zero whenever a full count is reached, in which case the full count (e.g. 96) is transferred to the fifo memory 5 together with the state of the pulse. In addition, the polarity of the signal is stored in the fifo memory 6 during the sampling period (duration between two pulse flanks or edges, maximally for each sampling period $T_o$). The polarity is determined by a polarity memory 2 and is held there. A microprocessor 7 takes over the content of the first fifo memory 6 and prepares a signal list 8 in a RAM memory which represents an image of the state of the lines.

It is further known from the above-mentioned state of the art to convert the content of the signal list 8 into line signals to, be transmitted. The content of the signal list 8 is conceived in this case as a bytewise presentation of the signals to be transmitted, always having one bit indicating the polarity and the remaining bits indicating the length of the signal.

The content of the signal list 8 is transferred byte-by-byte into a register 9. The register 9 is followed by a second programmable counter 11 which is driven by a second clock generator 10. The length statement of a byte, stored in the register 9, programs the counter 11. The counter 11 is controlled by the clock generator 10 and counts until during the programmed counter reading, an overflow signal occurs at the output of the counter 11 and is fed to a second state memory 12 as a time reference. The pulse state is fed to the second state memory 12 directly from the register 9. Always, when a counter overflow signal appears, an evaluation of a new pulse state is carried out in the second state memory. If a digital signal is generated in this manner and is delivered at the output out of the second polarity memory 12, an acknowledgement is given to the microprocessor 7 which takes the next signal byte from the signal list 8 and loads it into the register 9.

FIGS. 2a to 2d show examples of signal patterns (characters) on a receiving or transmitting line and their byte-by-byte-organized presentation in the signal list 8. 96 samples per sampling time $T_o$ are provided.

Figure 2A:
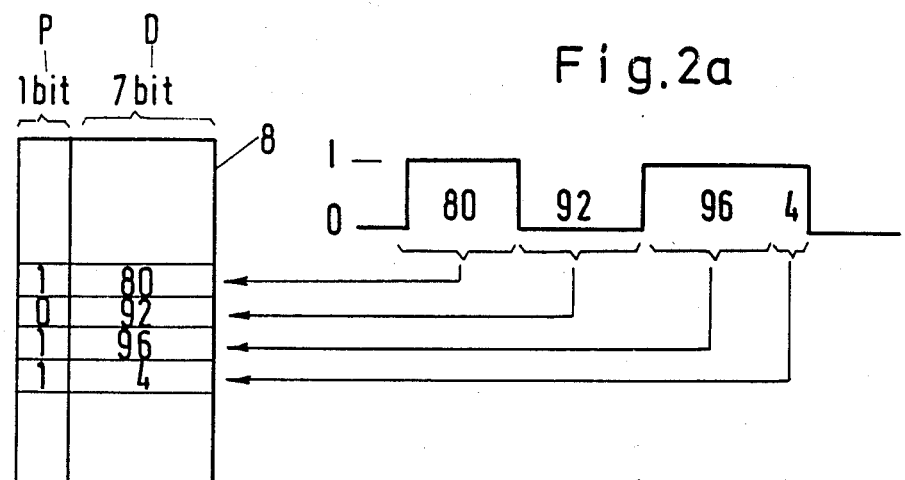
FIGS. 2a to 2d are graphs showing examples of signals and their resolution into signal bytes according to the invention, for deposition in the signal list.

FIG. 2a shows a first signal with an 1-state which is 80 clock periods long and is shown on the signal list 8 by a 1 for the state P and a number 80 for the duration D stored, encoded with 7 bits. This first signal is followed by a signal with 0-state which is 92 clock pulses long. The pulse (1-state) following as the third signal is 100 cycles long. It requires storage in two signal bytes in the signal list 8, namely, first a signal byte with the length specification 96 and a further signal byte with the length specification 4. Both signal bytes contain a 1 as the state statement.

Figure 2B:
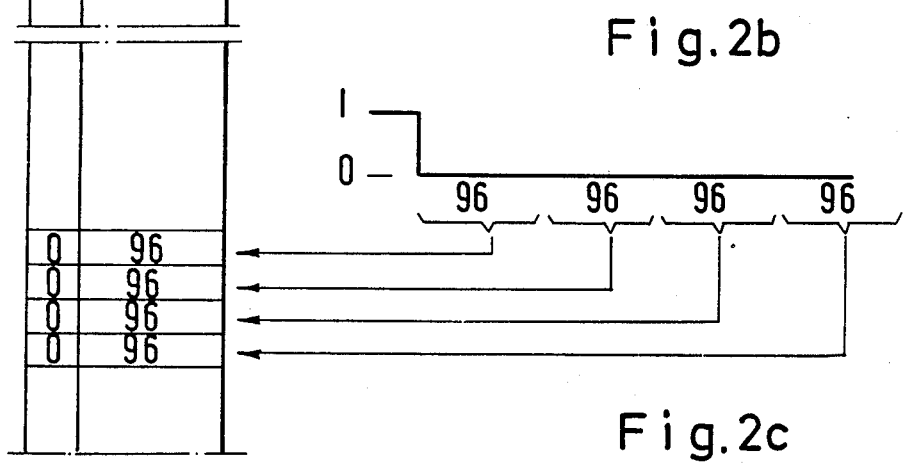

FIG. 2b shows how a rest position, i.e. a continuous 0-signal is presented in the signal list 8, namely, by similar signal bytes each with the length statement 96 and the state statement 0.

Figure 2C:
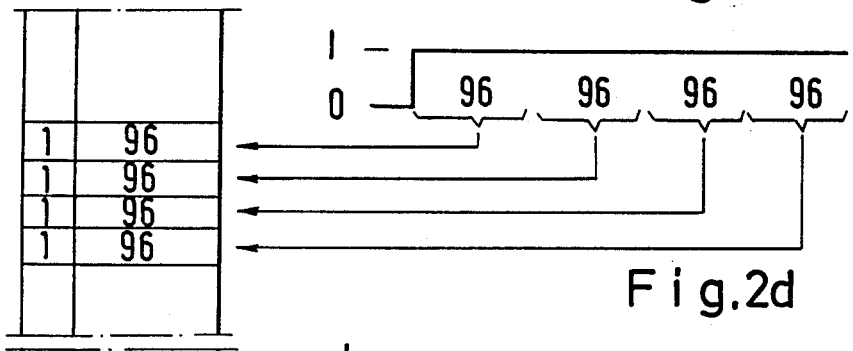

FIG. 2c shows an operating position with continuous 1-level. This line condition is presented in the list by a sequence of signal bytes with the length statement 96 and the state statement 1.

Figure 2D:
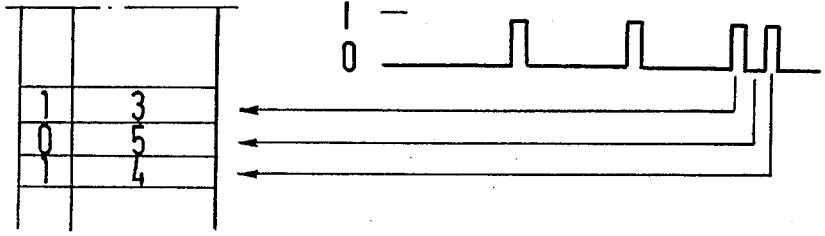

FIG. 2d shows how spikes, i.e. very short pulses and possibly also short pauses are presented in the list 8.

Figure 3:
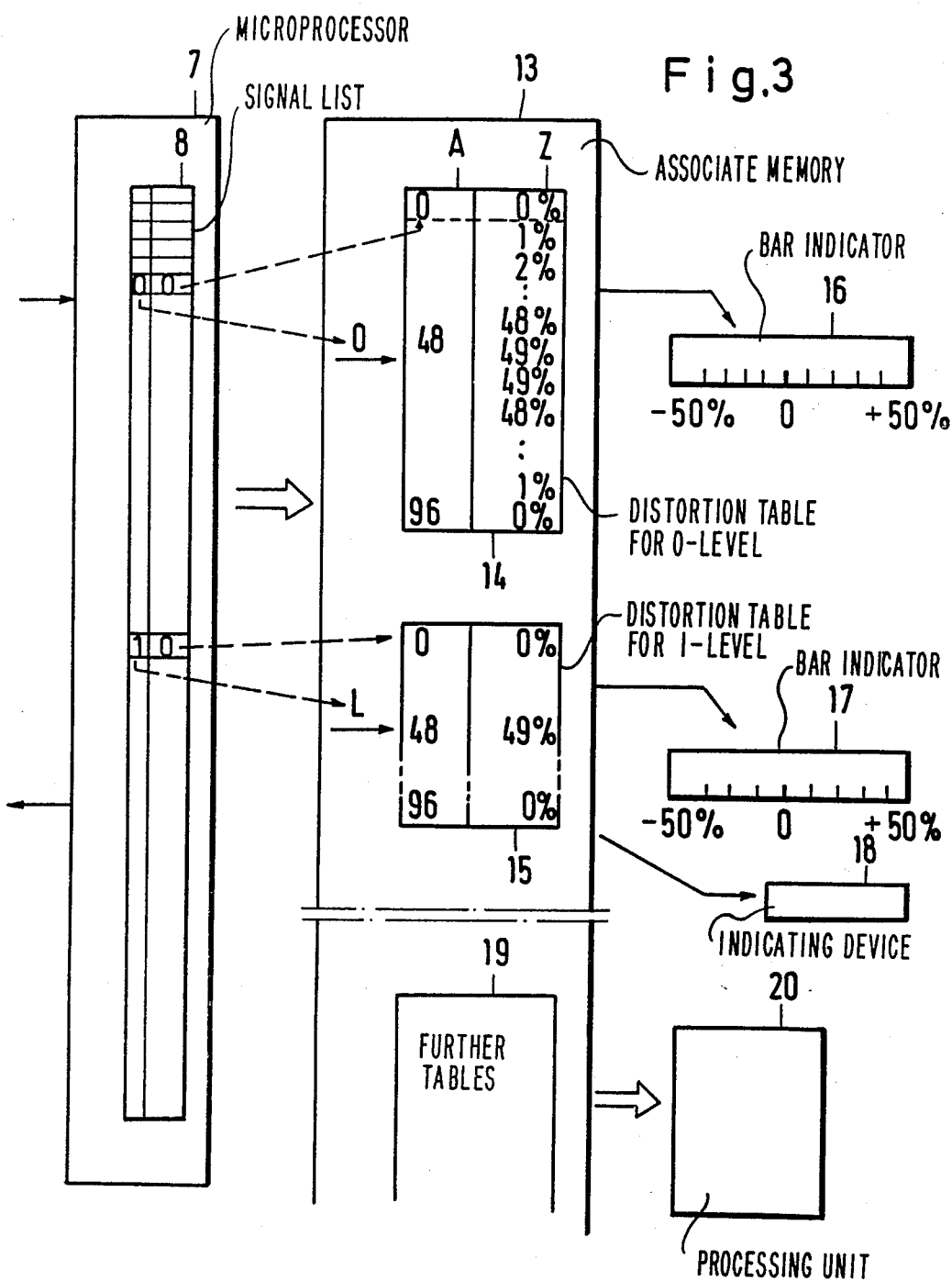
FIG. 3 is a block circuit diagram including a representation of the method according to the invention for the analysis of signals, especially for the measurement and display of signal distortion.

FIG. 3 shows a supplement to the prior art device constructed according to the invention. FIG. 3 shows that in an associate memory 13, tables 14, 15 are deposited which allow a conversion of the signal bytes stored in the list 8 into a statement on signal distortions, for instance, into a percent statement of the signal distortion. This signal distortion which, according to definition, can maximally be ±50%, can be displayed, for instance, in bar indicators 16, 17. In addition, the occurrence of spikes can be indicated by an indicating device 18, for instance, a lamp. Separate tables 14, 15 as well as separate bar, displays 16, 17 for 0-signals and 1-signals are provided. In the example shown, the same percent values are entered in the tables 14 and 15 for the 0 and 1-signals. However, it is also possible to assign different percentage values to the sampling numbers for 0 and 1-signals, where for instance, also signal distortions in signals of digital pulse width modulation DPDM can be measured.

It can be seen from FIG. 3 that the state bit of a signal byte stored in the signal list 8 can be used for selecting the corresponding table 14 (for 0-state) or 15 (for 1-state), and the signal byte can be used for addressing corresponding distortion values of the memory 13. A memory location lying within the table 14 or 15 is addressed according to the length information and thereby a corresponding rounded-off percentage value for the signal distortion is determined. The length statement 0 as well as the length statement 96 correspond to a signal distortion of 0%. The greatest signal distortion is reached for the length statement 48. In the range of a length statement of more than 48 to less than 96, the signal distortion is negative. If the length statement is smaller than or equal to 48, the length of the preceding signal bytes determine whether a positive signal distortion or a spike is involved. If the preceding signal byte had the length information 96, a positive signal distortion is present for a length of up to 48; if the length of the preceding signal deviates from 96, a spike is present at a length of 48. The displays 16, 17 and 18 are addressed in accordance with this interpretation.

The indication of the signal distortion need not relate to individual signal elements or the sampling time $T_o$, but can relate to randomly selectable sections of a data stream, such as to the signal elements belonging to a start signal. In this case, the display takes place only after individual distortion values have been interlinked according to a given algorithm, such as by forming mean values.

Besides tables 14 and 15, further tables 19 can be provided for determining the signal distortion, by means of which the analysis of messages in a processing unit 20 is possible, such as identification of signal elements, detection of start or sampling signals or a code analysis.

Figure 4:
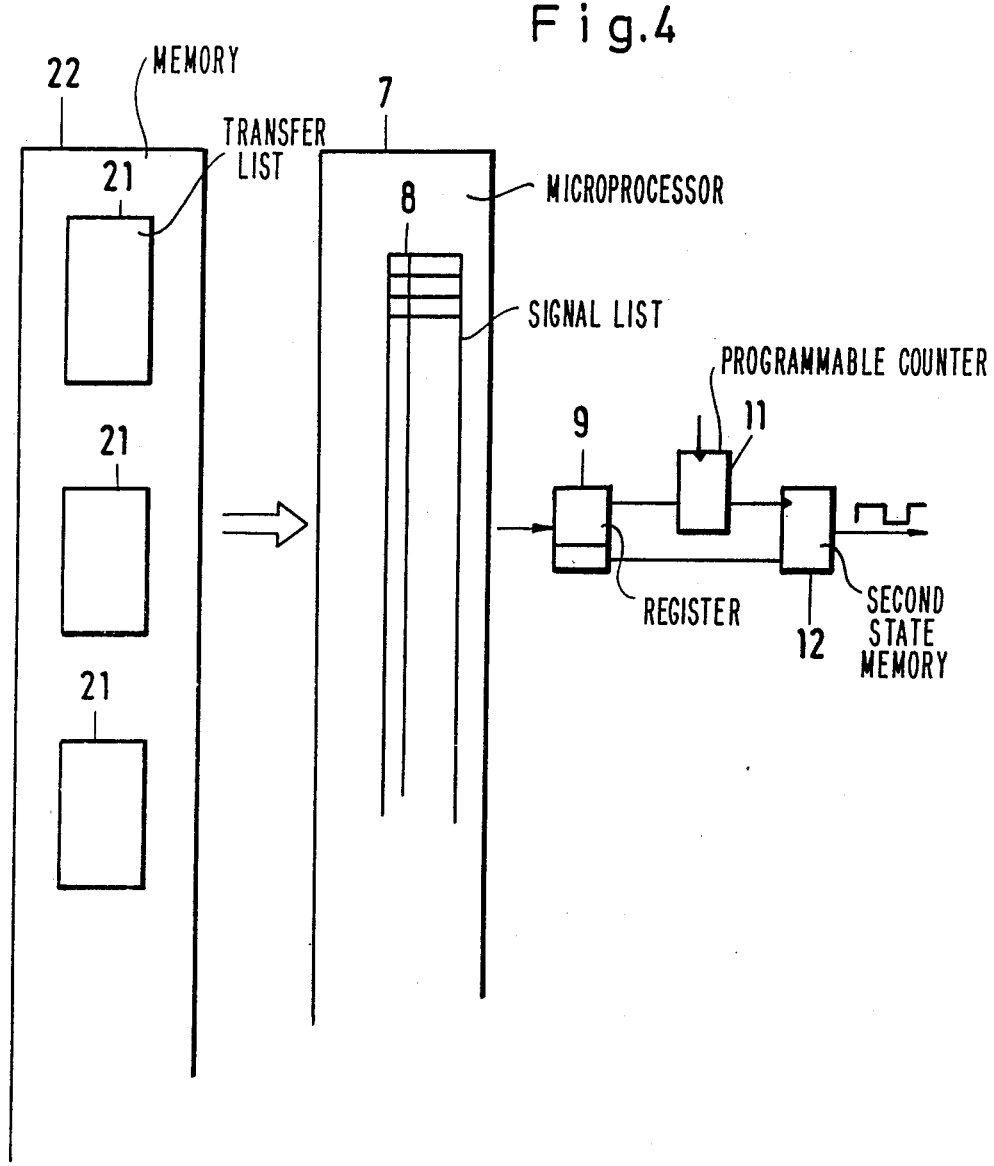
FIG. 4 is a view similar to FIG. 3 including a representation of the method according to the invention for the synthesis of signals.
Figure 5:
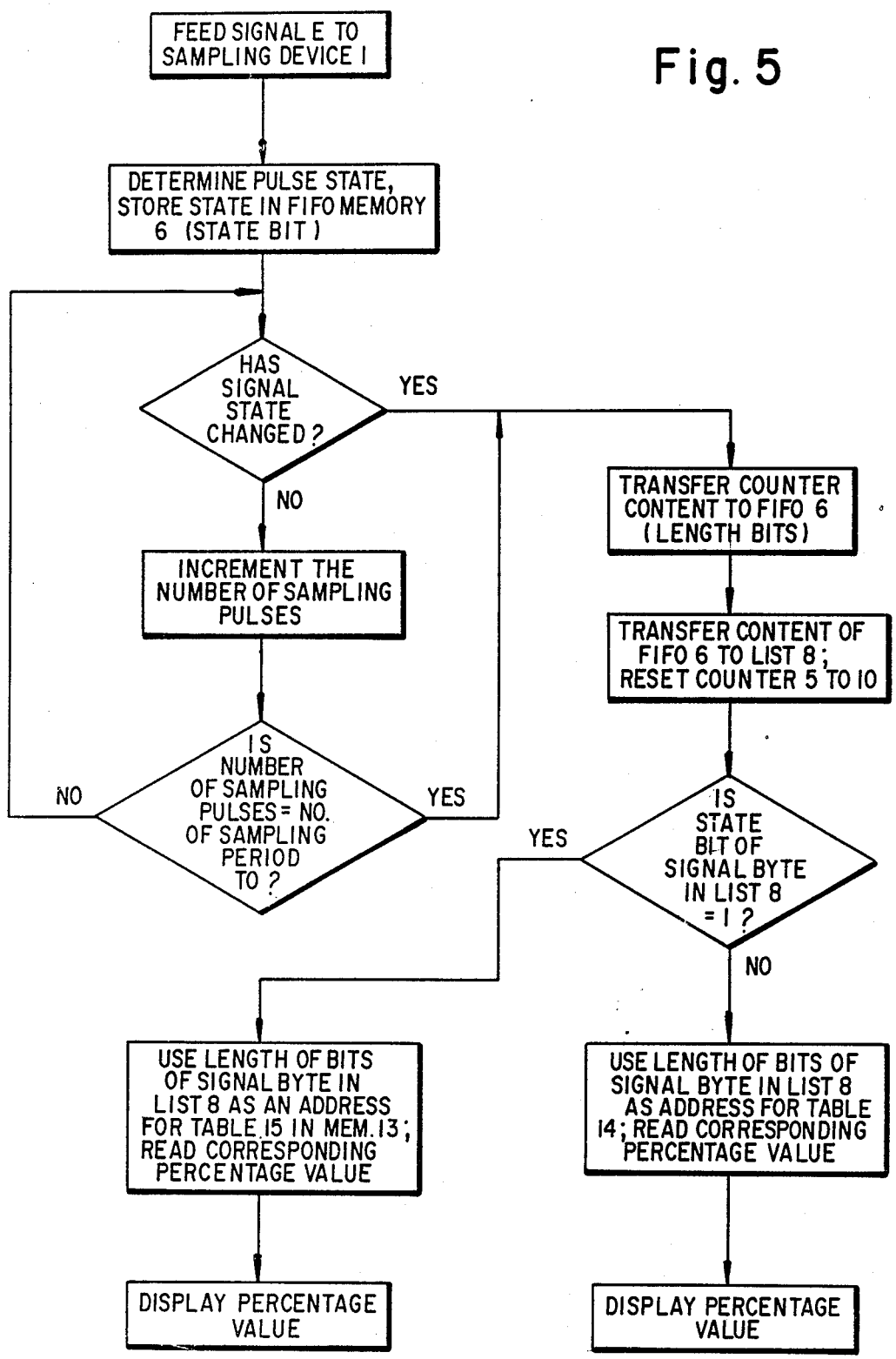
FIG. 5 is a flowchart showing the major steps of the method according to the invention.

FIG. 4 schematically shows the synthesis of signals. In this case, the microprocessor 7 takes data for signals to be transmitted from a memory 22 or transfer lists 21 stored there. The signals are interim-stored and processed in the signal list 8 as signal bytes, in a manner shown as an example in FIGS. 2a to 2d. One signal byte each is transferred from the signal list 8 into the register 9 and is converted into a line signal in the manner described already in connection with FIG. 1.

In one of the transfer lists 21, data, such as for standard signals or continuous signals, can be stored for providing standard transmission function. Alternatively, standard information for different transmission systems can be stored, which permits the function of a test transmitter.

The method according to the invention is also particularly well suited for providing a simulator, with which, for instance, remote control systems can be tested. In this connection, for instance, transmission disturbances can be simulated by means of test messages which simulate spikes, bundled disturbances, bit errors, code errors, synchronization errors or signal distortions determined as percentage values.

With an apparatus for carrying out the method according to the invention, disturbances actually occurring on a transmission line can be determined and can be stored by recording the data streams in a high-resolution presentation in the signal list 8 and optionally transferred there into another memory. Such recordings can also be used at another location, such as by signal synthesis in a laboratory for test purposes.

A further possible application of the method is to correct received signals (equalizing, error correction) and to send them backward or forward in corrected form.

We claim:

1. A method for analysis of binary signal pulses having respective pulse durations and pulse states, which comprises the steps of: measuring the duration of each signal pulse by counting units of time in a counter while receiving the pulses; determining the pulse state by means of a state memory; resetting the counter at each pulse state change transferring as signal bytes the counter-reading and respective pulse state reached into a fifo memory at a further pulse state change; resetting and restarting the counter; transferring the signal bytes to a signal list in a microprocessor; taking the signal bytes from the signal list for retransmission of signals and loading the signal bytes into a register; controlling a programmable counter on the basis of the counter-reading of the signal bytes; determining the respective duration of the signal pulses to be retransmitted on the basis of the respective counter-reading; determining the state of the respective pulses to be retransmitted by means of the state bit of the respective signal bytes; forming distortion tables in an associate memory; addressing the distortion tables by means of the counter information of the signal bytes deposited in the signal list; and reading the signal distortion values from said distortion tables.

2. Method according to claim 1, which comprises depositing the signal distortion values in the tables as percentage values.

3. Method according to claim 1, which comprises displaying the read-out distortion values as bar indicators.

4. Method according to claim 1, which comprises forming further tables which are addressed by signal bytes from the signal list, forming auxiliary values; and performing a determination of the start signals and other signals and an analysis of the information content of said binary signals by means of the auxiliary values.

5. Method according to claim 1, which comprises detecting spikes by evaluating the read-out signal distortion values.

6. Method according to claim 1, which comprises calling information from transfer lists for the synthesis of signal; and transferring the information as signal bytes into the signal list.

* * * * *